US006321239B1

(12) United States Patent
Shackelford

(10) Patent No.: US 6,321,239 B1
(45) Date of Patent: Nov. 20, 2001

(54) EFFICIENT VOLUME COPY USING PRE-CONFIGURATION OF LOG STRUCTURED TARGET STORAGE

(75) Inventor: David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/162,264

(22) Filed: Sep. 28, 1998

(51) Int. Cl.$^7$ .................................................. G06F 17/30
(52) U.S. Cl. ........................... 707/206; 707/10; 709/219; 711/5; 711/205
(58) Field of Search ................................. 707/3, 10, 100, 707/205, 206; 711/4, 111, 170, 205, 136, 5, 160; 709/203, 216, 219

(56) References Cited

U.S. PATENT DOCUMENTS

| 5,398,142 | | 3/1995 | Davy ...................................... 360/48 |
| 5,403,639 | * | 4/1995 | Belsan et al. ......................... 707/204 |
| 5,530,850 | | 6/1996 | Ford et al. ............................ 395/600 |
| 5,551,003 | | 8/1996 | Mattson et al. ....................... 395/463 |
| 5,555,371 | | 9/1996 | Duyanovich et al. ........... 395/182.11 |
| 5,632,012 | * | 5/1997 | Belsan et al. ............................. 714/6 |
| 6,038,639 | * | 3/2000 | O'Brien et al. ....................... 711/114 |

OTHER PUBLICATIONS

J. P. Considine et al., "Reduction of Storage Fragmentation On Direct Access Devices", International Business Machines Corporation Journal Res. Develop., vol. 23, No. 2, Mar. 1979, pp. 140–148.

"Reorganizing Data on Log–Structured File Systems", *IBM Technial Disclosure Bulletin*, vol. 37, No. 06A, Jun. 1994, pp. 623–624.

\* cited by examiner

*Primary Examiner*—Jean R. Homere
(74) *Attorney, Agent, or Firm*—Dan Hubert & Assoc.

(57) ABSTRACT

Source data is more efficiently copied to log structured target storage by pre-configuring the target storage. The invention may be practiced in a system including a host, a storage controller, and the target storage. The host maintains a directory identifying logical units of stored data, and the storage controller maintains records classifying storage space as uncollected free space, collected free space, or space-in-use. First, the host receives input including source data and specification of a logical unit for the source data. In response, the host directs the storage controller to classify any storage space of the log target storage containing data of the specified logical unit as uncollected free space. This pre-configures the log structured storage to more efficiently receive the source data. In another embodiment, the host may consult the directory to determine whether the specified logical unit already exists, and only if so, proceed to direct re-classification of the storage space as uncollected free space. In another embodiment, the host may blindly issue a "space release" instruction for the specified logical unit, which is ignored by the storage controller if the logical unit does not already exists in storage. After pre-configuration, the host instructs the storage controller to write the source data to the log structured storage. The storage controller performs the write, and also changes the directory to classify the storage space now occupied by source data as space-in-use.

33 Claims, 4 Drawing Sheets

EFFICIENT VOLUME COPY USING PRE-CONFIGURATION OF LOG STRUCTURED TARGET STORAGE

BACKGROUND OF THE INVENTION

1. Field of the Invention

The present invention relates to the storage of machine-readable data. More particularly, the invention concerns a method and apparatus for more efficiently copying source data to a log structured storage target by pre-configuring the target.

2. Description of the Related Art

With the increasing popularity of computers, users are faced with more data than ever to transmit, receive, and process. Data storage is also critically important to many applications. One popular data storage configuration is "log structured storage." Log structuring is one way to manage units of storage, such as data tracks in an array of magnetic "hard" disks.

With log structured storage, a storage controller classifies storage space as "space-in-use," "uncollected free space," and "collected free space." Space-in-use describes storage space that contains valid data. Uncollected free space describes storage space that does not contain valid data, but is nevertheless unavailable to store data. For example, if data records only occupy part of a logical unit (such as a "track"), the unoccupied part of that logical unit is uncollected free space. Although this space is unused, it is unavailable to store further data because data is stored in track-size segments regardless of whether the entire track is filled. Collected free space describes storage space that is available to store data. This kind of storage space, for example, may have been formerly occupied by valid data that has been deleted or otherwise released.

Typically, storage controllers use linked lists to keep track of the various types of log structured storage. For example, separate linked lists may be used to track space-in-use, uncollected free space, and collected free space. This approach to space accounting is beneficial to many users because it does not require much management overhead. In contrast, with non-log-structured configurations the storage system must be able to receive and process users'requests to allocate storage. This type of storage system first allocates storage of sufficient size to store data, and then stores the data in the allocated storage. Log structured storage systems avoid the need to allocate storage.

Instead of allocating storage in advance, log structured storage stores the data one logical unit at a time. For each logical unit of data to be stored, the storage controller first consults the "collected free space" list to identify a unit of available storage space, and then stores the data in the free space. When there is a small amount of data to write, or a large amount of collected free space, storage is completed rapidly. In many cases, the storage controller is able to maintain a sufficient amount of collected free space in advance by running a collector subprogram to identify suitable data storage and reclassify it as collected free space. This type of collection, called "off-line collection" herein, may be performed periodically, whenever uncollected free space exceeds a certain threshold, etc.

Despite the use of off-line collection, a situation can arise when the data to be written exceeds the collected free space. In this event, the storage controller invokes another collection procedure, referred to herein as "on-line collection." Namely, when there is no more collected free space, the storage controller performs the following steps for each storage track: (1) identifying a track of uncollected free space, (2) changing status of this track to "collected free space," (3) writing the data to the freed unit, and (4) changing the reused unit's listing to "space-in-use." Although on-line collection is beneficial from the standpoint of minimizing overhead, it incurs a significant delay, which may be too much for some users. Chiefly, users may experience excessive delays when there are many write operations to perform, but relatively little collected free space. One situation exemplifying this problem is a full volume copy, a task that copies an entire volume of data to a target storage, and therefore involves many write operations.

An example of this situation is illustrated in FIG. 1, which shows contents of a log structured storage during various stages of a full volume copy. At first, the log structured storage has the contents 100. The contents 100 include other data 102 (unrelated to the full volume copy), an existing version of the volume being copied 104, and some collected free space 106.

When the full volume copy operation begins, it first writes data of the new version to the free area 106, until this area is full. At this point, the device has contents 103, including the formerly-free area 108, now filled with one part of the volume being copied. At this point, the device is full. To continue the full volume copy, then, the on-line collector must be used to examine and collect storage space to make more collected free space. In particular, the on-line collection process is invoked for each track of source data to be stored. This involves searching the log structured array for uncollected free space, and then consolidating, moving, and otherwise reorganizing data to convert the uncollected free space into collected free space. For example, if two tracks are each half-full (i.e., half space-in-use and half uncollected free space), the on-line collection process might relocate data from both tracks together onto a single track, and list the address of the old track as collected free space.

This process continues until the entire volume has been copied, at which time the device has the contents 105. Specifically, the volume has been completely written, as shown by 108 and 110. The remainder 112 of the existing version 104 is then subject to eventual off-line collection, or possibly on-line collection if the storage controller writes further data before off-line collection is activated next.

Some users may find the scenario of FIG. 1 to be undesirable because of the time delay involved. The chief delay is incurred by the consolidating, moving, and reorganizing of data to convert uncollected free space into collected free space. Moreover, this process is invoked repeatedly since on-line collection is invoked for each track to be written. When the source data is sizeable and the collected free space is low, data storage efficiency is at its lowest level.

Consequently, the existing on-line collection process is not completely adequate for some applications due to certain unsolved problems, which ultimately slow the overall storage process.

SUMMARY OF THE INVENTION

Broadly, the present invention concerns a method and apparatus for more efficiently copying source data to a log structured storage target by pre-configuring the target. The invention may be practiced in a system including a host, a storage controller, and the log structured target storage. The host maintains metadata identifying logical units of stored data, and the storage controller maintains a directory classifying storage space as being uncollected free space, collected free space, or space-in-use.

First, the host receives input including source data and specification of a logical unit for the source data. In response, the host directs the storage controller to classify any of the log structured storage space that already contains data corresponding to the specified logical unit as uncollected free space. This pre-configures the log structured storage to more efficiently receive the source data. In one embodiment, the host may first consult the directory to determine whether the specified logical unit already exists in storage, and only if so, proceed to re-classify the storage space as uncollected free space. In another embodiment, the host may blindly issue a "space release" instruction for the specified logical unit, which is ignored by the storage controller if the logical unit does not already exist in storage.

After pre-configuration, the host instructs the storage controller to write the source data to the log structured storage. When the storage controller completes the write the controller updates its directory to show the storage space occupied by the source data as space-in-use, and the host changes the metadata to associate the written source data with the specified logical unit.

In one embodiment, the invention may be implemented to provide a method to more efficiently copy source data to log structured storage by pre-configuring the target storage. In another embodiment, the invention may be implemented to provide an apparatus, such as a storage controller or storage subsystem, programmed to more efficiently copy source data to log structured storage by pre-configuring the target storage. In still another embodiment, the invention may be implemented to provide a signal-bearing medium tangibly embodying a program of machine-readable instructions executable by a digital data processing apparatus to perform method steps for more efficiently copying source data to log structured storage by pre-configuring the target storage.

The invention affords its users with a number of distinct advantages. Chiefly, pre-configuration according to this invention readies the log structured storage to quickly receive the source data without requiring the time-consuming on-line collection process. Accordingly, write operations are completed more quickly, especially when there are many records to write and little collected free space remaining on the storage. One common example of this situation is the "full volume copy" operation. The invention also provides a number of other advantages and benefits, which should be apparent from the following description of the invention.

DETAILED DESCRIPTION

Figure 1:
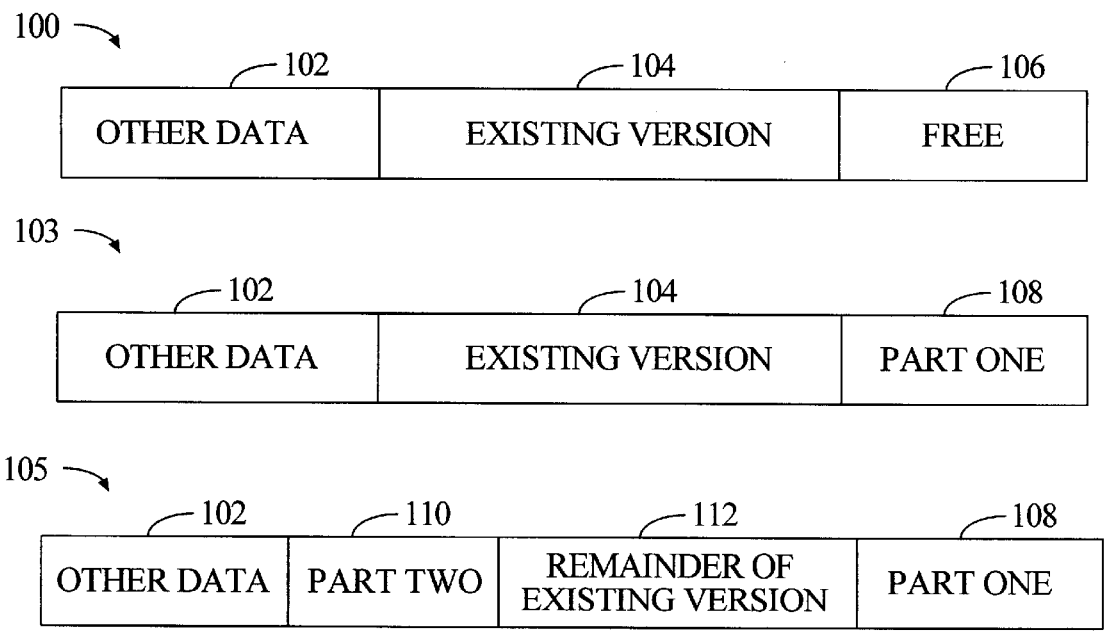
FIG. 1 is a block diagram showing the contents of an exemplary log structured data storage space before and after a full volume copy operation, in accordance with the prior art.

The nature, objectives, and advantages of the invention will become more apparent to those skilled in the art after considering the following detailed description in connection with the accompanying drawings. As mentioned above, the invention concerns a method and apparatus for more efficiently copying source data to a log structured storage target by pre-configuring the target.

HARDWARE COMPONENTS & INTERCONNECTIONS

Storage System Structure

One aspect of the invention concerns a storage system, configured to efficiently copy source data to log structured storage as discussed below. As an example, this system may be embodied by various hardware components and interconnections as described in FIG. 2. More specifically, the system 200 includes a host computer 202, also called a "host." The host 202 is coupled to a primary storage site 204, a secondary storage site 210, metadata storage 216, and a tape storage 218.

The host 202 may be implemented by various digital processing units, such as a mainframe computer, computer workstation, personal computer, supercomputer, etc. In one specific example, the host 202 may comprise an IBM mainframe computer such as an S/390 machine supporting the MVS operating system.

The metadata storage 216 contains various statistics (called "metadata") about the data stored by the primary storage site 204, secondary storage site 210, and tape storage 218. For example, the metadata storage 216 may contain high level metadata such as mapping between named datasets and the logical volumes in which they are stored. The metadata storage 216 may be implemented by a disk drive storage, on-board storage of the host 202, battery powered RAM, or another suitable storage type.

In the illustrated example, the primary site 204 contains a primary controller 206 coupled to a secondary storage 208. Similarly, the secondary site 210 includes a primary controller 212 coupled to a secondary storage 214. Each of the primary and secondary storage sites may be embodied, for example, by an IBM brand RAMAC storage subsystem. In this particular embodiment, the storage 208/214 comprises magnetic disk drive storage.

In contrast to the disk media of the primary and secondary storage 208/214, the tape storage 218 utilizes magnetic tape media. As such, the tape storage 218 may be suitable for longer term data archival. As an example, the tape storage 218 may comprise an IBM model 3590 tape storage system.

The foregoing example illustrates one hardware environment in which the invention may be applied. This particular setup is especially useful for maintaining backup copies of data for disaster recovery and the like. In this application, the primary storage site 204 is used to store primary or "source" data, with the secondary site 210 and/or tape 218 maintaining backup copies of the source data. In this environment, the host 202 may serve to implement a data mover, such as the IBM Extended Remote Copy ("XRC") product, which is commercially available and widely known in the art.

Log Structured Storage

One feature of the invention is the copying of data to a target location of log structured storage. For explanatory purposes, the target location is assumed to be the secondary site 210 in the example of FIG. 2. The copy operation may involve copying of one or more datasets, or a larger scale copy such as a full volume copy operation. Furthermore, these copying operations may be embodied in move, migrate, restore, or other operations that write data to storage and thereby copy the data.

The target storage (i.e., the secondary storage 214 in this example) is configured as log structured storage. Accordingly, the storage controller 212 maintains statistics that classify storage space of the secondary storage 214 as (1) collected free space, (2) uncollected free space, or (3) space-in-use. These statistics are stored in a directory 250, and may be organized in various forms, such as a linked list, table, database, etc. The controller 212 also maintains map 251 that cross-references the name of each logical unit contained in the storage 214 with the physical space actually occupied by that data.

Digital Data Processing Apparatus

In contrast to the overall data storage system described above, another aspect of the invention concerns a digital data processing apparatus, specifically configured to implement the host 202.

Figure 3:
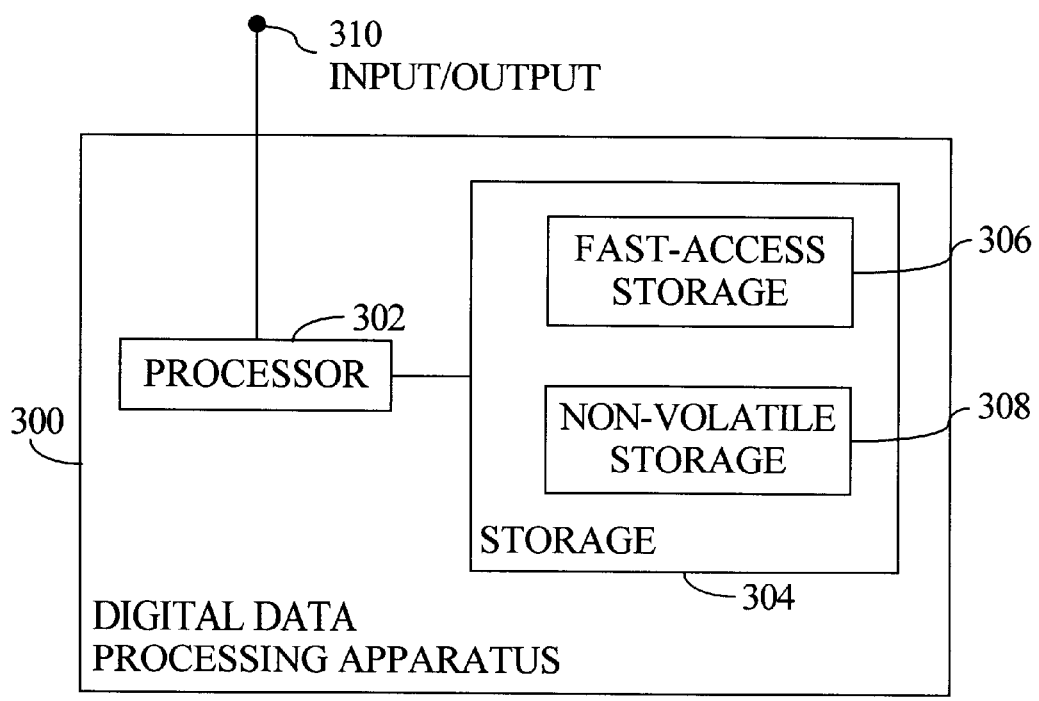
FIG. 3 is a block diagram of a digital data processing machine in accordance with the invention.

FIG. 3 shows an example of one digital data processing apparatus 300. The apparatus 300 includes a processor 302, such as a microprocessor or other processing machine, coupled to a storage 304. In the present example, the storage 304 includes a fast-access storage 306, as well as nonvolatile storage 308. The fast-access storage 306 may comprise random access memory, and may be used to store the programming instructions executed by the processor 302. The nonvolatile storage 308 may comprise, for example, one or more magnetic data storage disks such as a "hard drive," a tape drive, or any other suitable storage device. The apparatus 300 also includes an input/output 310, such as a line, bus, cable, electromagnetic link, or other means for the processor 302 to exchange data with locations external to the apparatus 300.

Despite the specific foregoing description, ordinarily skilled artisans (having the benefit of this disclosure) will recognize that the apparatus discussed above may be implemented in a machine of different construction, without departing from the scope of the invention. As a specific example, one of the components 306, 308 may be eliminated; furthermore, the storage 304 may be provided on-board the processor 302, or even provided externally to the apparatus 300.

OPERATION

In addition to the various hardware embodiments described above, a different aspect of the invention concerns a method for more efficiently copying source data to a log structured storage target by pre-configuring the target.

Signal-Bearing Media

Figure 2:
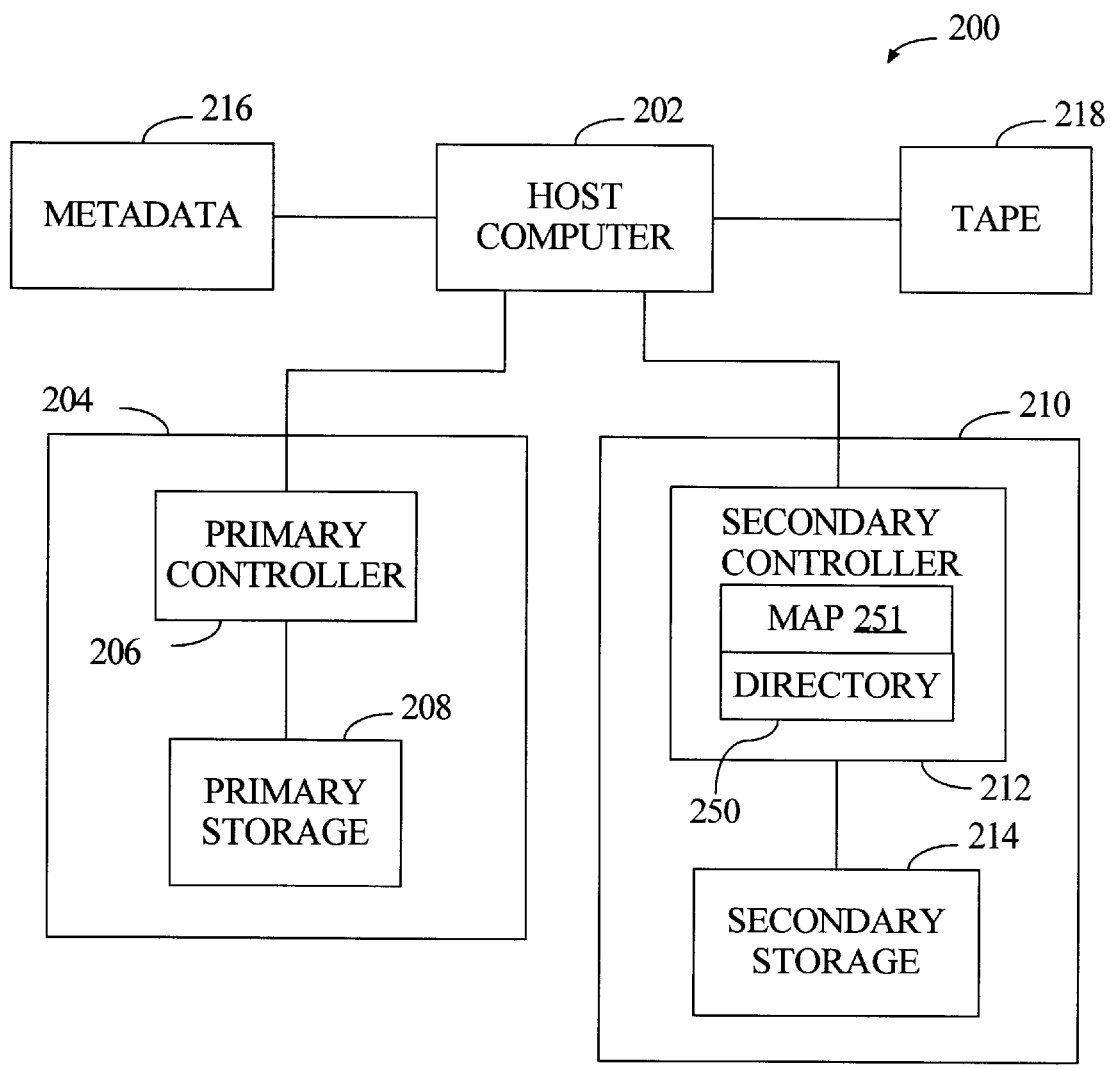
FIG. 2 is a block diagram of the hardware components and interconnections of a data storage system in accordance with the invention.

In the context of FIGS. 2–3, such a method may be implemented, for example, by operating the host 202, as embodied by a digital data processing apparatus 300, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to more efficiently copy source data to log structured storage target by preconfiguring the target.

Figure 4:
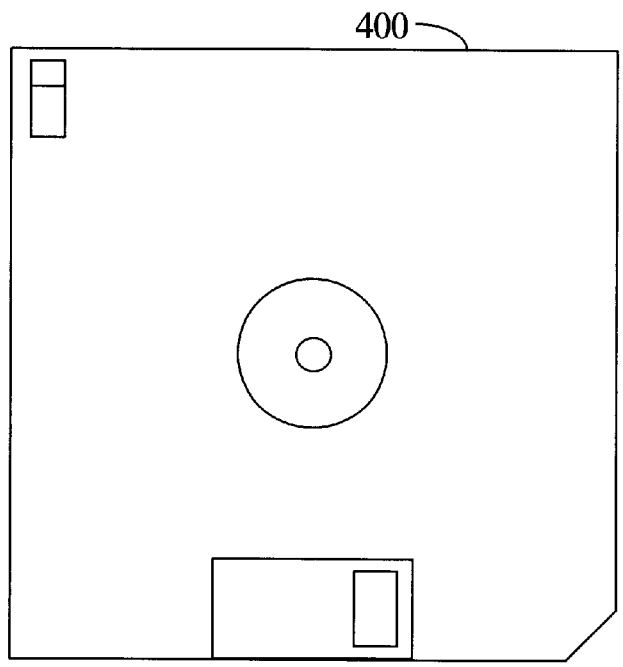
FIG. 4 shows an exemplary signal-bearing medium in accordance with the invention.

This signal-bearing media may comprise, for example, RAM (not shown) contained within the host 202, as represented by the storage 304. Alternatively, the instructions may be contained in another signal-bearing media, such as a magnetic data storage diskette 400 (FIG. 4), directly or indirectly accessible by the host 202. Whether contained in the storage 304, diskette 404, or elsewhere, the instructions may be stored on a variety of machine-readable data storage media, such as direct access storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Overall Sequence of Operation

Figure 5:
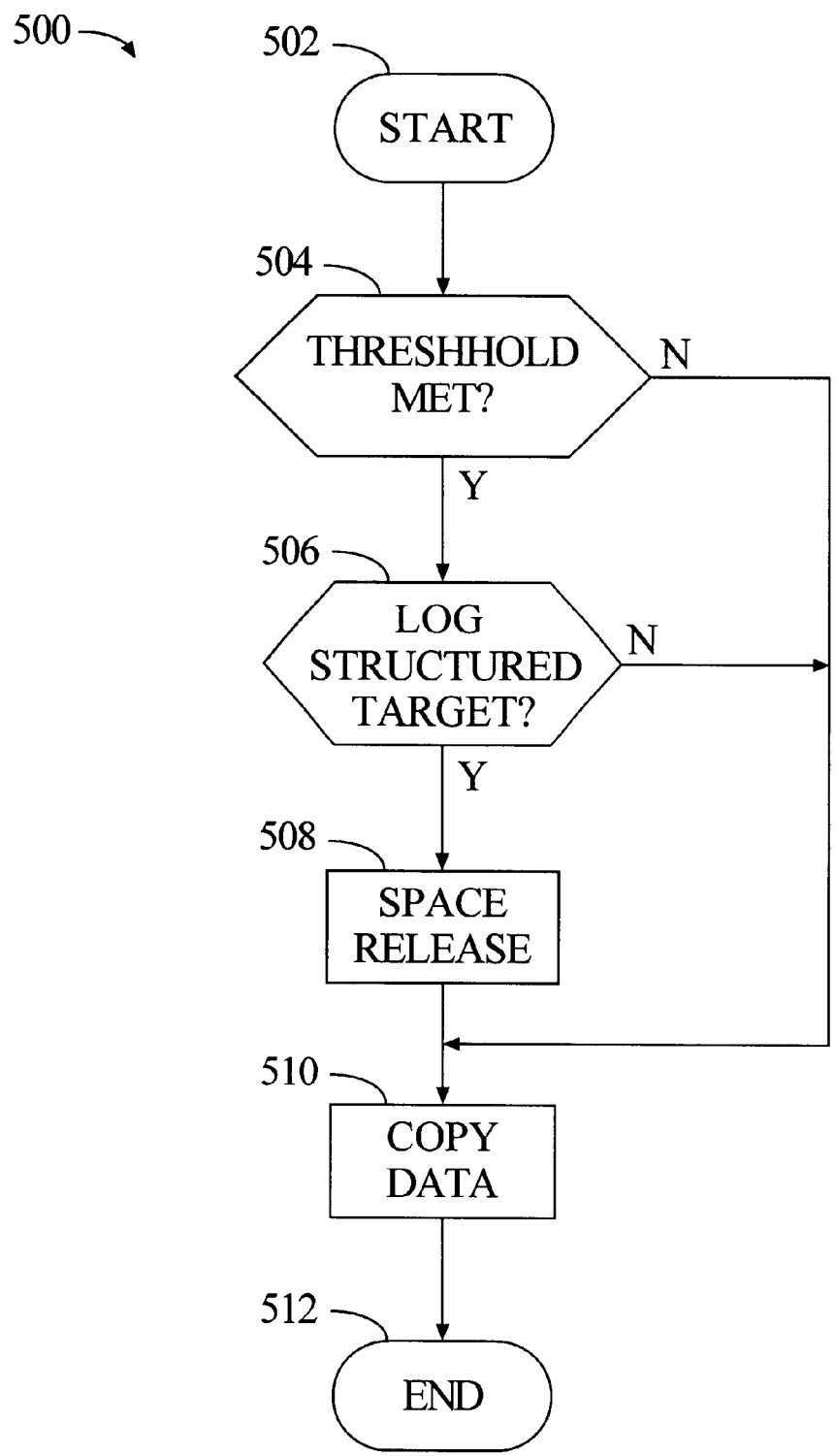
FIG. 5 is a flowchart of an operational sequence for performing a volume copy with pre-configuration of log structured storage.

FIG. 5 shows a sequence 500 for copying data to a log structured target, to illustrate one example of the method aspect of the present invention. For ease of explanation, but without any intended limitation, the example of FIG. 5 is described in the context of the system 200 described above. The sequence 500, which is performed by the host 200, is initiated in step 502 when the host 202 receives a storage request including source data and specification of a target logical unit for the source data. For example, the step 502 may occur when the host 202 receives a 100 Kb source dataset and specification of a particular volume of the secondary storage 214 as the target logical unit. The target logical unit may be identified by using a name of the associated data, such as a unique file name, volume name, or other dataset name. Alternatively, each logical storage unit may specify a logical volume, group of records, address extent, dataset, record, or another convenient unit of data regarded by the host 202.

In the present example, where the target storage is the secondary storage 214, the source data may originate from the primary storage 208 or the tape storage 218. As an alternative, the source data may arise from another source, such as another computer, a server console or other interface to a human user, an application program running on the host 202 or elsewhere, etc.

After step 502, the host 202 asks whether the source data meets a minimum threshold size (step 504). If this size is met, data storage will be expedited by performing a "space release" action before starting to store the source data, as explained below. The threshold is predetermined, and may be fixed by pre-programming the host 202, entry by a system administrator, etc. As an example, the threshold may be about one megabyte. This threshold is easily met for large scape copy operations such as a (1) "full volume copy," which copies an entire logical volume of data from one storage device to another, (2) "full volume restore," which copies an entire volume of data from backup storage such as the tape storage 218, (3) "XRC initialization," which creates a new backup volume by copying an entire primary volume, or (4) other such operations.

If the threshold is not met, then storage of the data is not likely to be any faster with the space release action. In this event, step 504 advances to step 510, which copies the source data without pre-configuring the target storage. Following step 510, the sequence 500 ends in step 512.

In contrast, if step 504 finds that the threshold is met, the host 202 in step 506 asks whether the specified target storage is log structured. If not, then the space release concept (discussed more thoroughly below) is inapplicable, and step 506 proceeds to 510, which copies the source data without pre-configuring the target storage. The routine 500 then ends in step 512.

In contrast to the negative exits from step 504/506, step 508 is performed if the threshold is met (step 504) and the target storage is log structured (step 506). Step 508 involves a "space release" action, which is implemented by the host 202 instructing the secondary controller 212 to classify certain space of the target storage as uncollected free space. Namely, the host 202 directs the secondary controller 212 to reclassify any existing storage space corresponding to the source data as collected free space. This space is amenable to such reclassification (and effective deletion of its contents) because the newly received source data constitutes a new version of the existing data. The space release action is issued specifically for the logical unit of the source data; accordingly, if data corresponding to the space logical unit already exists on the storage 214, the space release command is effective in deleting the data by reclassifying it as collected free space in the directory 250. The logical unit of the source data (new) and stored data (old) may comprise a volume serial number ("volser"), for example. To provide a further example, if the space release action (step 508) is issued for volser 1FX290-E, and data residing in the storage 214 has the same volser, the space release command is effective in deleting the existing data by reclassifying its storage space as collected free space in the directory 250. In the illustrated embodiment, the host 202 issues a "space release" I/O command, which is a known command utilized by IBM brand RAMAC storage subsystems.

In the RAMAC system, the storage controller 212 ignores host-issued space release commands if a counterpart to the specified source data does not already reside on the secondary storage 214. Therefore, there is no need for the host 202 to determine whether a previous version of the source data already exists on the target storage 214.

In a different embodiment, the host 202 may consult its metadata 216 before issuing the space release command to determine whether a previous version of the specified source data already exists on the target storage 214. This involves consulting the metadata 216 to ascertain whether the source data's logical unit (e.g., name) is already listed therein. In the illustrated example, where the source data is a full volume, this is performed by consulting the metadata 216 to determine whether the volume serial number ("volser") of the source data is already listed in the metadata 216. If not, the host 202 may skip issuance of the space release command.

Following step 508, the host in step 510 instructs the secondary storage controller 212 to write the source data to the log structured secondary storage 214. As part of this process, the secondary controller 212 also changes its directory 250 to list the space now occupied by the source data as space-in-use. Also, in step 510, the secondary controller 212 updates its map 251 to show the storage locations of the source data. This may be performed, for example, by ensuring that the map 251 cross-references the source data's volser to the physical storage space containing the source data. As a further part of step 510, the host 202 may update its metadata 216 to properly reflect storage of the source data. For example, this update may involve changing the metadata 216 to show the correct volume, cylinder, sector, track, or other logical unit where the source data is stored.

For various reasons, the copying of step 510 can be completed more efficiently than prior techniques. Namely, if the target storage contains uncollected free space due to the space release of step 508, this space will have a substantial size (since the threshold of step 504 was met). This large amount of uncollected free space is easily converted to collected free space by the on-line collection process, which is invoked by the copy operation of step 510. Similarly, this uncollected free space may be converted to collected free space if the off-line collection process is invoked before step 510. Thus, the copy operation is not burdened with the need to reconfigure space-in-use to create larger blocks of uncollected free space as each track of source data is stored to target storage 214.

After the expedited copy operation of step 510 completes, the routine 500 ends in step 512.

State of Target Storage: Step-by-Step

Figure 6:
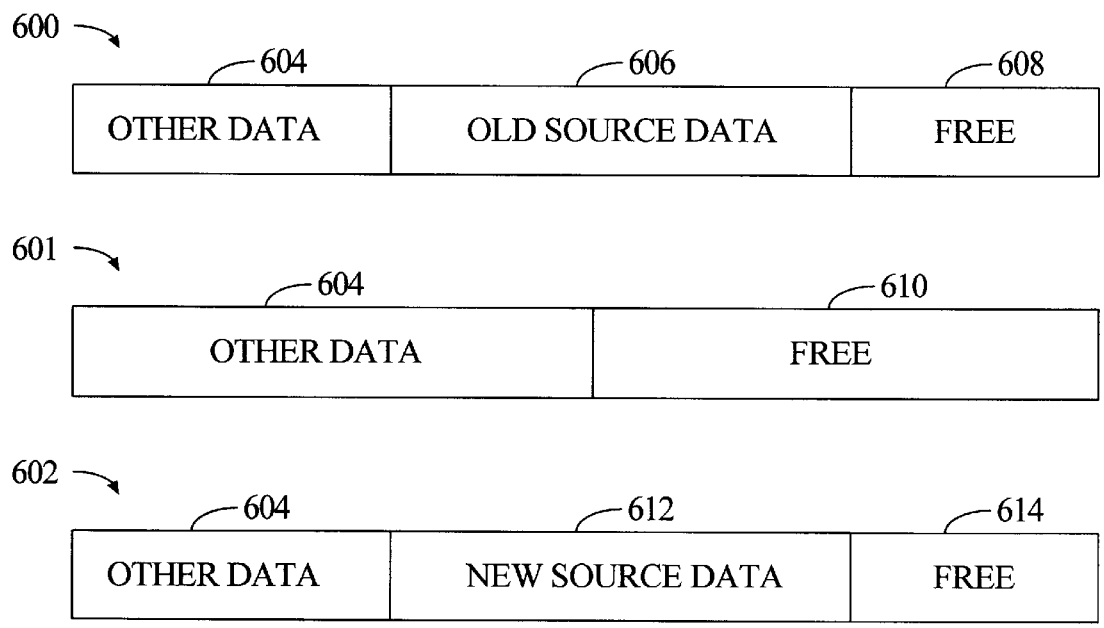
FIG. 6 is a block diagram showing the contents of an exemplary log structured data storage space before and after a full volume copy operation with storage pre-configuration, in accordance with the invention.

FIG. 6 further illustrates the operation of the invention by progressively depicting the state of the secondary storage 214 in several simplified block diagrams. Before performing the routine 500, the target storage 214 has the contents 600. The contents 600 include other data 604 (unrelated to the present copy operation), a previous version of the source data being copied 606, and some collected free space 608.

After the size threshold is met (step 504), and the target storage is found to be log structured (step 506), step 508 performs the space release operation, as discussed above. After the space release operation, the target storage 214 has the contents 601. The To contents 601 include other data 604 (as before), where the remainder is now free space 610. The free space 610 includes the collected free space 608 and the area 606 (which is now uncollected free space).

When the source data is written in step 510, it can be efficiently written to the free space 610, resulting in the contents 602. Namely, the source data 612 is easily written into the free space 610. The old source data 606, first converted to uncollected free space by the space release operation of step 508, is ultimately converted to collected free space by the off-line collection process, or by the on-line collection process during the copy operation itself (step 510).

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for writing data to a log structured target storage in a computer system that includes a host, a storage controller coupled to the host, and the target storage coupled to the storage controller, where the host maintains metadata identifying logical units of data contained in the target storage, and where the storage controller maintains a directory classifying storage space of the target storage as being uncollected free space, collected free space, or space-in-use, the method comprising the operations of:

the host receiving input including source data and specification of a logical unit associated with the source data;

the host directing the storage controller to classify any storage space of the target storage containing data associated with the specified logical unit as uncollected free space; and the host instructing the storage controller to write the source data to the target storage.

2. The method of claim 1, the operations further comprising:

prior to the operation of directing the storage controller, the host consulting the metadata to determine whether the specified logical unit is already identified therein, and if not, the host foregoing the operation of directing the storage controller.

3. The method of claim 1, where the operations of the host directing the storage controller comprises the host issuing a space release command for the specified logical unit.

4. The method of claim 1, the operations further comprising:
in response to receiving the input data, the host determining whether the target storage is log structured, and if not, aborting the directing and instructing operations.

5. The method of claim 1, the specified logical unit comprising a storage volume.

6. The method of claim 1, the specified logical unit comprising a subpart of a storage volume.

7. The method of claim 1, the operations further comprising:
in response to the host instruction, the storage controller writing the source data to the target; and
concurrently with the writing of the source data, the storage controller performing an on-line collection process to convert uncollected free space into collected free space available for writing the source data.

8. The method of claim 1, the operations further comprising:
prior to the storage controller writing the source data to the target storage, the storage controller applying an off-line collection process to the target storage, the off-line collection process classifying at least some of the uncollected free space of the target storage as collected free space.

9. The method of claim 1, the operations further comprising:
in response to the host instruction, the storage controller writing the source data to the target storage; and
the storage controller changing the directory to classify storage space occupied by the source data as space-in-use.

10. The method of claim 1, the operations further comprising:
after the operation of the host directing the storage controller, the host updating the metadata to associate the written source data with the specified logical unit.

11. The method of claim 1, the operations further comprising:
determining whether the source data has at least a prescribed size, and if not, aborting the operation of the host directing the storage controller to classify any storage space of the target storage containing data associated with the specified logical unit as uncollected free space.

12. A signal-bearing medium tangibly embodying a program of machine-readable instructions executable by a digital processing apparatus to perform a method for writing data to a log structured target storage in a computer system that includes a host, a storage controller coupled to the host, and the target storage coupled to the storage controller, where the host maintains metadata identifying logical units of data contained in the target storage, and where the storage controller maintains a directory classifying storage space of the target storage as being uncollected free space, collected free space, or space-in-use, the method comprising the operations of:
the host receiving input including source data and specification of a logical unit associated with the source data;
the host directing the storage controller to classify any storage space of the target storage containing data associated with the specified logical unit as uncollected free space; and
the host instructing the storage controller to write the source data to the target storage.

13. The medium of claim 12, the operations further comprising:
prior to the operation of directing the storage controller, the host consulting the metadata to determine whether the specified logical unit is already defined therein, and if not, the host foregoing the operation of directing the storage controller.

14. The medium of claim 12, where the operation of the host directing the storage controller comprises the host issuing a space release command for the specified logical unit.

15. The medium of claim 12, the operations further comprising:
in response to receiving the input data, the host determining whether the target storage is log structured, and if not, aborting the directing and instructing operations.

16. The medium of claim 12, the specified logical unit comprising a storage volume.

17. The medium of claim 12, the specified logical unit comprising a subpart of a storage volume.

18. The medium of claim 12, the operations further comprising:
after the operation of the host directing the storage controller, the host updating the metadata to associate the written source data with the specified logical unit.

19. The medium of claim 12, the operations further comprising:
determining whether the source data has at least a prescribed size, and if not, aborting the operation of the host directing the storage controller to classify any storage space of the target storage containing data associated with the specified logical unit as uncollected free space.

20. A computer-driven data storage system, comprising:
a log structured target storage;
a storage controller coupled to the target storage, the storage controller maintaining a directory classifying storage space of the target storage as being uncollected free space, collected free space, or space-in-use; and
a host, coupled to the storage controller, the host maintaining metadata identifying logical units of data contained in the target storage, the host being programmed to write data to the target storage by performing operations comprising:
the host receiving input including source data and specification of a logical unit associated with the source data;
the host directing the storage controller to classify any storage space of the target storage containing data associated with the specified logical unit as uncollected free space; and
the host instructing the storage controller to write the source data to the target storage.

21. The system of claim 20, the host being further programmed to perform operations comprising:
prior to the operation of directing the storage controller, the host consulting the metadata to determine whether the specified logical unit is already identified therein, and if not, the host foregoing the operation of directing the storage controller.

22. The system of claim 20, where the operation of host directing the storage controller comprises the host issuing a space release command for the specified logical unit.

23. The system of claim 20, the host being further programmed to perform operations comprising:

in response to receiving the input data, the host determining whether the target storage is log structured, and if not, aborting the directing and instructing operations.

24. The system of claim 20, the specified logical unit comprising a storage volume.

25. The system of claim 20, the specified logical unit comprising a subpart of a storage volume.

26. The system of claim 20, the storage controller being programmed to perform operations comprising:

in response to the host instruction, the storage controller writing the source data to the target storage; and concurrently with the writing of the source data, the storage controller performing an on-line collection process to convert uncollected free space into collected free space available for writing the source data.

27. The system of claim 20, the storage controller being programmed to perform operations comprising:

prior to the storage controller writing the source data to the target storage, the storage controller applying an off-line collection process to the target storage, the off-line collection process classifying at least some of the uncollected free space of the target storage as collected free space.

28. The system of claim 20, the storage controller being programmed to perform operations comprising:

in response to the host instruction, the storage controller writing the source data to the target storage; and the storage controller changing the directory to classify storage space occupied by the source data as space-in-use.

29. The system of claim 20, the host being further programmed to perform operations comprising:

after the directing of the storage controller, the host updating the metadata to associate the written source data with the specified logical unit.

30. The system of claim 20, the host being further programmed to perform operations comprising:

determining whether the source data has at least a prescribed size, and if not, aborting the operation of the host directing the storage controller to classify any storage space of the target storage containing data associated with the specified logical unit as uncollected free space.

31. The method of claim 1, where the operations of the host directing the storage controller comprises:

issuing a space release command for the specified logical unit independent of without checking for the presence of the specified logical host unit in the target storage.

32. A method for writing data to a log structured target storage in a computer system that includes a host, a storage controller coupled to the host, and the target storage coupled to the storage controller, where the host maintains metadata identifying logical units of data contained in the target storage, and where the storage controller maintains a directory classifying storage space of the target storage as being uncollected free space, collected free space, or space-in-use, the method comprising the operations of:

the host receiving input including source data and specification of a logical unit associated with the source data;

the host directing the storage controller to classify any storage space of the target storage containing data associated with the specified logical unit as uncollected free space and then the host instructing the storage controller to write the source data to the target storage.

33. A computer-driven data storage system, comprising:

first means for log structured target storage of data;

second means coupled to the target storage for controlling the first means and maintaining a directory classifying storage space of the target storage as being uncollected free space, collected free space, or space-in-use;

metadata identifying logical units of data contained in the first means;

third means coupled to the second means and the metadata for writing data to the first means by:

receiving input including source data and specification of a logical unit associated with the source data;

directing the second means to classify any storage space of the target storage containing data associated with the specified logical unit as uncollected free space and then instructing the second means to write the source data to the target storage.

* * * * *

UNITED STATES PATENT AND TRADEMARK OFFICE
CERTIFICATE OF CORRECTION

PATENT NO. : 6,321,239 B1
DATED : November 20, 2001
INVENTOR(S) : Shackelford

It is certified that error appears in the above-identified patent and that said Letters Patent is hereby corrected as shown below:

Column 6,
Line 3, change "404" to -- 400 --
Line 21, change "200" to -- 202 --

Column 8,
Line 22, change "The To contents 601" to -- The contents 601 --
Line 58, insert -- in response to receiving the input, -- before "the host"
Line 62, insert -- in response to classification of any storage space of the target storage containing data associated with the specified logical unit as uncollected free space, -- before "the host"

Column 10,
Lines 1 and 55, insert -- in response to receiving the input, -- before "the host"
Lines 5 and 59, insert -- in response to classification of any storage space of the target storage containing data associated with the specified logical unit as uncollected free space, -- before "the host"

Column 12,
Line 8, delete "independent of"
Line 40, delete "directing the second means to classify any storage space of the target storage containing data associated with the specified logical unit as uncollected free space and then instructing the second means to write the source data to the target storage." add -- in response to receiving the input, directing the second means to classify any storage space of the target storage containing data associated with the specified logical unit as uncollected free space;
in response to classification of any storage space of the target storage containing data associated with the specified logical unit as uncollected free space, instructing the second means to write the source data to the target storage. --

Signed and Sealed this

Seventh Day of May, 2002

*Attest:*

JAMES E. ROGAN
*Attesting Officer*     *Director of the United States Patent and Trademark Office*